US012783960B2

(12) United States Patent
Rajagopalan et al.

(10) Patent No.: US 12,783,960 B2
(45) Date of Patent: Nov. 3, 2026

(54) SYSTEM AND METHOD FOR DISTRIBUTED LEARNING USING DYNAMICALLY ENCRYPTED DATA ITEMS

(71) Applicant: Bank of America Corporation, Charlotte, NC (US)

(72) Inventors: Anurajam Rajagopalan, Chennai (IN); Pushkar Taneja, Hyderabad (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 520 days.

(21) Appl. No.: 18/508,472

(22) Filed: Nov. 14, 2023

(65) Prior Publication Data

US 2025/0156748 A1 May 15, 2025

(51) Int. Cl.
*G06N 20/00* (2019.01)
*H04L 9/40* (2022.01)

(52) U.S. Cl.
CPC ............. *G06N 20/00* (2019.01); *H04L 63/20* (2013.01)

(58) Field of Classification Search
CPC ................................ G06N 20/00; H04L 63/20
See application file for complete search history.

(56) References Cited

U.S. PATENT DOCUMENTS 8,769,272 B2 7/2014 Mattsson
9,361,481 B2 6/2016 LaFever et al.
9,405,928 B2 * 8/2016 Amarendran ......... G06F 21/602
9,485,088 B2 11/2016 Johnson
10,771,240 B2 9/2020 Carson et al.
10,970,402 B2 4/2021 Verma et al.
11,238,164 B2 2/2022 Ricotta et al.
11,782,614 B1 10/2023 Sapuntzakis et al.
2017/0272472 A1 * 9/2017 Adhar .................. G06F 21/602
(Continued)

FOREIGN PATENT DOCUMENTS

CN 111190487 A 5/2020
CN 115017541 A 9/2022
CN 115622800 A 1/2023

OTHER PUBLICATIONS

Puthal, Deepak, et al. "SEEN: A selective encryption method to ensure confidentiality for big sensing data streams." IEEE Transactions on Big Data 5.3 (2017): 379-392. (Year: 2017).*
(Continued)

*Primary Examiner* — Kevin W Figueroa

(57) ABSTRACT

A method includes receiving and analyzing data items to generate a weight for each data item. In response to determining that a first weight of a first data item is within a first weight range, the method determines that the first data item has a high security level. In response to determining that a second weight of a second data item is within a second weight range, the method determines that the second data item has a medium security level. A first subset of the data items having the high security level are encrypted with a first cryptography algorithm to generate first encrypted data items. A second subset of the data items having the medium security level are encrypted with a second cryptography algorithm to generate second encrypted data items. An artificial intelligence/machine learning model is trained using the first and second encrypted data items as a training data set.

20 Claims, 3 Drawing Sheets

(56) References Cited

U.S. PATENT DOCUMENTS

| | | | |
|---|---|---|---|
| 2020/0082270 | A1 | 3/2020 | Gu et al. |
| 2020/0302296 | A1 | 9/2020 | Miller |
| 2020/0364561 | A1 | 11/2020 | Ananthanarayanan et al. |
| 2021/0234673 | A1 * | 7/2021 | Kurian .................. H04L 9/3234 |
| 2021/0409197 | A1 | 12/2021 | Baracaldo Angel et al. |
| 2022/0050921 | A1 | 2/2022 | LaFever et al. |
| 2023/0068386 | A1 | 3/2023 | Akdeniz et al. |

OTHER PUBLICATIONS

Yang, Guangcan, et al. "An efficient attribute-based encryption scheme with data security classification in the multi-cloud environment." Electronics 12.20 (2023): 4237. (Year: 2023).*

Tawalbeh, Lo'ai, et al. "A secure cloud computing model based on data classification." Procedia Computer Science 52 (2015): 1153-1158. (Year: 2015).*

* cited by examiner

SYSTEM AND METHOD FOR DISTRIBUTED LEARNING USING DYNAMICALLY ENCRYPTED DATA ITEMS

TECHNICAL FIELD

The present disclosure relates generally to computer learning, and more specifically to a system and method for distributed learning using dynamically encrypted data items.

BACKGROUND

Current enterprise systems generate large data sets, which may be stored in centralized data storage/processing systems and used as training data sets to train artificial intelligence/machine learning (AI/ML) models. As the generated data sets grow, time needed to train AI/ML models may grow exponentially and the amount of computer resources (e.g., storage, memory, processing power, network bandwidth, etc.) that are needed for centralized data storage/processing systems also grows. Furthermore, while training the AI/ML models, security of the training data sets is important.

SUMMARY

The system described in the present disclosure provides several practical applications and technical advantages that overcome the current technical problems with computer learning.

In general, a system for distributed learning using dynamically encrypted data items includes a plurality of data processing systems operably coupled to a central data processing system via a network. A first data processing system is configured to receive a first plurality of data items. The first plurality of data items are classified according to data security levels. For example, a first subset of the first plurality of data items may have a "high" security level, a second subset of the first plurality of data items may have a "medium" security level, a third subset of the first plurality of data items may have a "low" security level, a fourth subset of the first plurality of data items may have a "public" security level. The first data processing system is further configured to encrypt the first, second, third and fourth subsets of the first plurality of data items based on the data security level. For example, the first subset of the first plurality of data items may be encrypted using stronger cryptography algorithms than the second subset of the first plurality of data items and the second subset of the first plurality of data items may be encrypted using stronger cryptography algorithms than the third subset of the first plurality of data items. In certain examples, the fourth subset of the first plurality of data items may be left unencrypted. In other examples, the third and fourth subsets of the first plurality of data items may be encrypted using a same cryptography algorithm. The first data processing system is further configured to train a first artificial intelligence/machine learning (AI/ML) model using a first training data set. In certain embodiments, the first training set includes encrypted first, second and third subsets of the first plurality of data items and the fourth subset of the first plurality of data items. In other embodiments, the first training set includes encrypted first, second, third and fourth subsets of the first plurality of data items.

The rest of the plurality of data processing systems are configured to train respective AI/MI models in an analogous manner as the first data processing system. For example, a second data processing system may be configured to train a second AI/ML model using a second training data set. In certain embodiments, the second data processing system receives and classifies a second plurality of data items according to data security levels. The second plurality of data items are encrypted based on respective data security levels and are used as the second training set. The central data processing system is configured to receive the trained AI/ML models from the plurality of data processing systems and generate an aggregate AI/ML model based on the received trained AI/ML models.

The present disclosure provides various advantages. By storing received data items in respective data processing systems and encrypting the received data items based on data security levels, security of the data items is improved. Furthermore, computer resources (e.g., storage, memory, processing power, network bandwidth, etc.) that would otherwise be used when encrypting all data items irrespective of the security levels may be saved and used for other purposes. By not exchanging data items between any of the plurality of data processing systems and the central data processing system, the security of the data items and the computer resource utilization are further improved. By training each AI/ML model in the respective data processing system and using the trained AI/ML models to generate an aggregate AI/ML model, a time needed to train the aggregate AI/ML model is reduced. Accordingly, the following disclosure is particularly integrated into practical applications of: (1) improving data security while training AI/ML models; (2) improving a time needed to train AI/ML models; and (3) improving utilization of computer resources while training AI/ML models.

In one embodiment, a system includes a central data processing system and a plurality of data processing systems operably coupled to the central data processing system. A first data processing system includes a first memory and a first processor operably coupled to the first memory. The first memory is configured to store a first data security policy and first artificial intelligence/machine learning (AI/ML) model. The first data security policy includes a first plurality of security levels. The first plurality of security levels include a high security level, a medium security level, a low security level, and a public security level. The first data security policy further includes a first plurality of weight ranges associated with the first plurality of security levels and a first plurality of cryptography algorithms associated with the first plurality of security levels. The first processor is configured to receive a first plurality of data items, analyze the first plurality of data items to generate a weight for each of the first plurality of data items, and classify the first plurality of data items according to the first plurality of security levels based on the weights of the first plurality of data items. Classifying the first plurality of data items includes comparing a first weight of a first data item of the first plurality of data items to the first plurality of weight ranges, in response to determining that the first weight of the first data item of the first plurality of data items is within a first weight range of the first plurality of weight ranges, determining that the first data item of the first plurality of data items has the high security level, comparing a second weight of a second data item of the first plurality of data items to the first plurality of weight ranges, and in response to determining that the second weight of the second data item of the first plurality of data items is within a second weight range of the first plurality of weight ranges, determining that the second data item of the first plurality of data items has the medium security level. The first processor is configured to encrypt a first subset of the first plurality of data items having the high security level with a first cryptography algorithm to generate first encrypted data items, encrypt a second subset of the first plurality of data items having the medium security level with a second cryptography algorithm to generate second encrypted data items, and train the first AI/ML model using a first training data set. The second cryptography algorithm is different from the first cryptography algorithm. The first training data set includes the first encrypted data items and the second encrypted data items.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
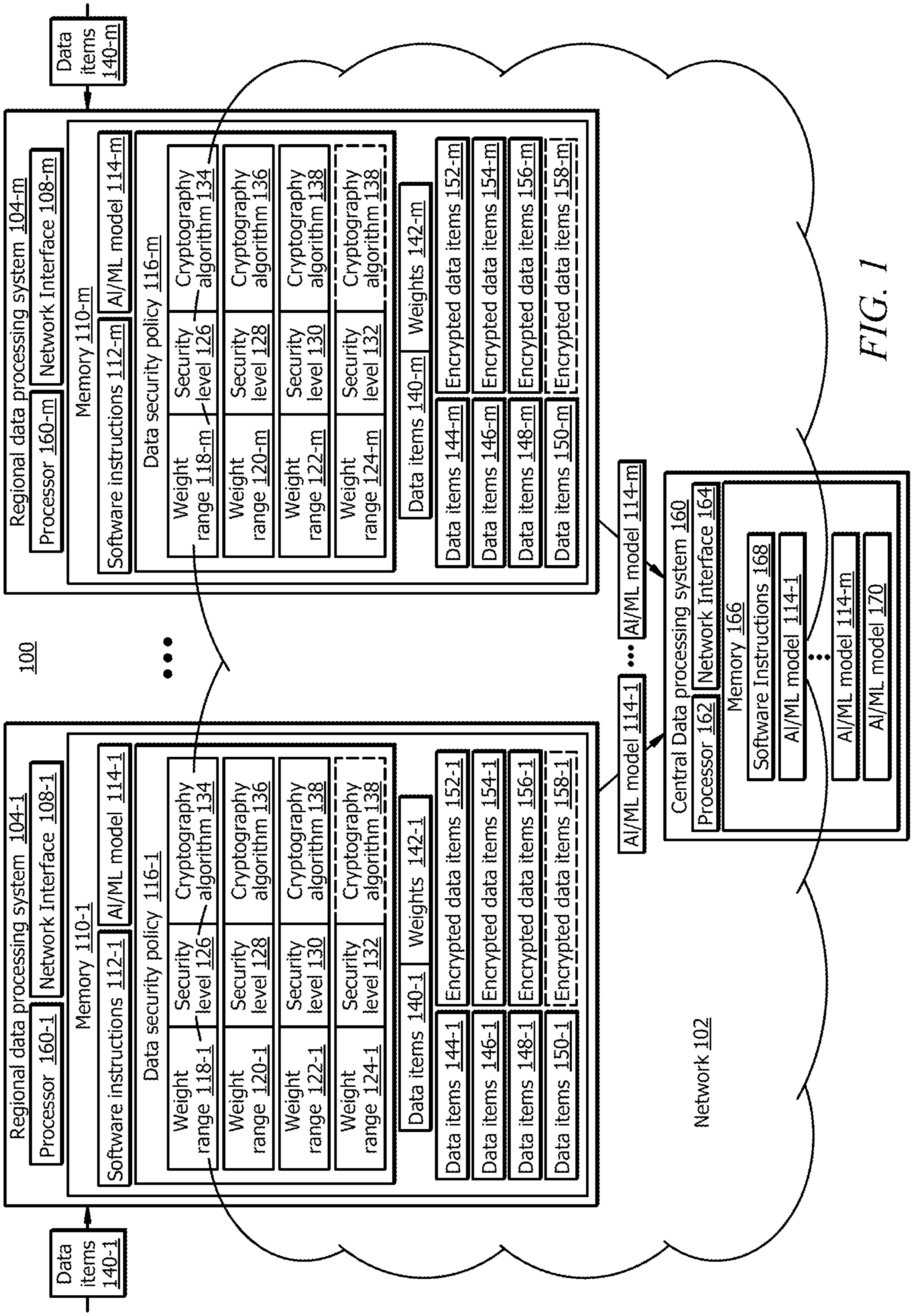
FIG. 1 illustrates an embodiment of a system configured for distributed learning using dynamically encrypted data items.
Figure 2A:
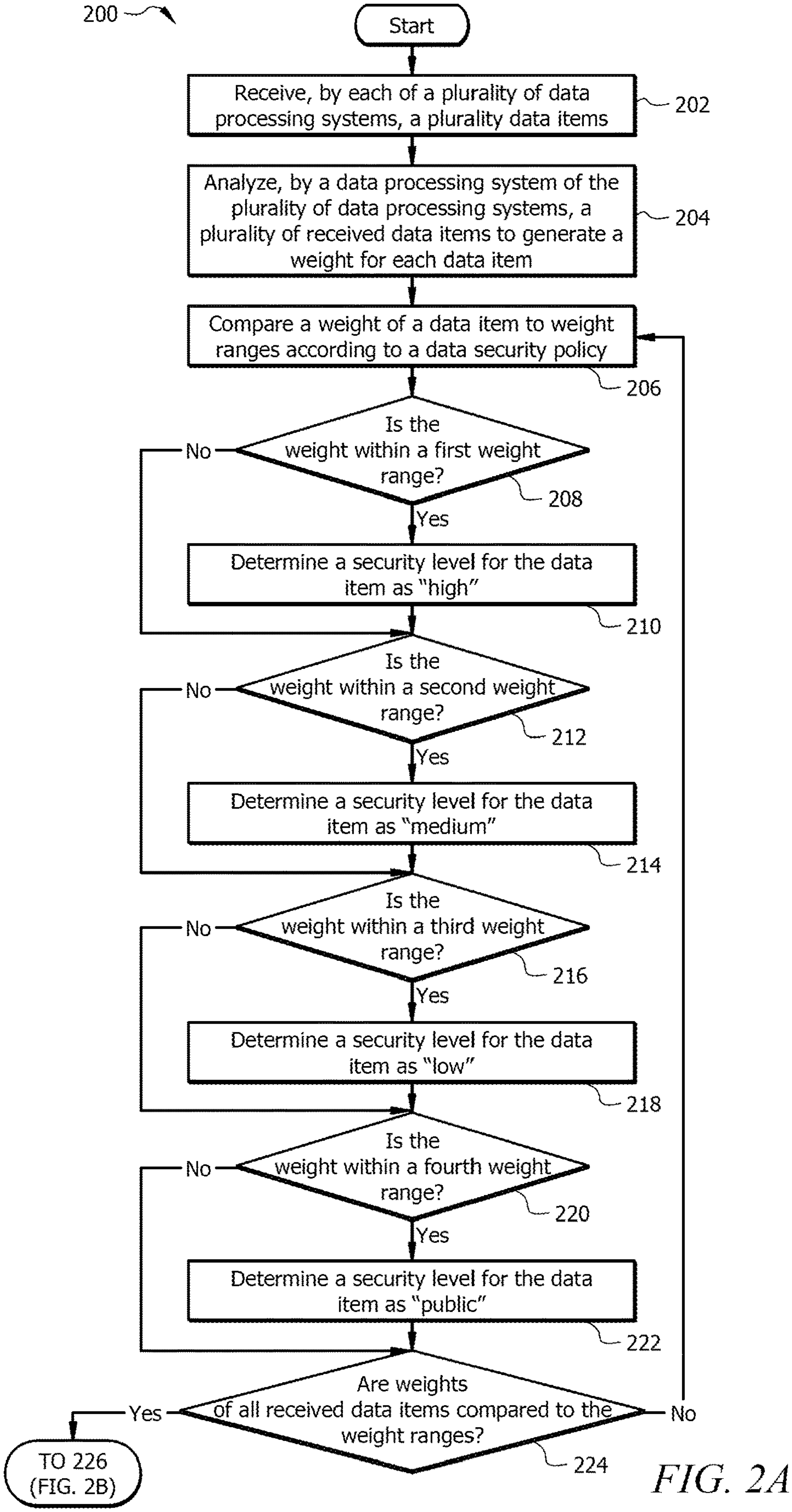
FIGS. 2A and 2B illustrate an example operational flow of system of FIG. 1 for distributed learning using dynamically encrypted data items.
Figure 2B:
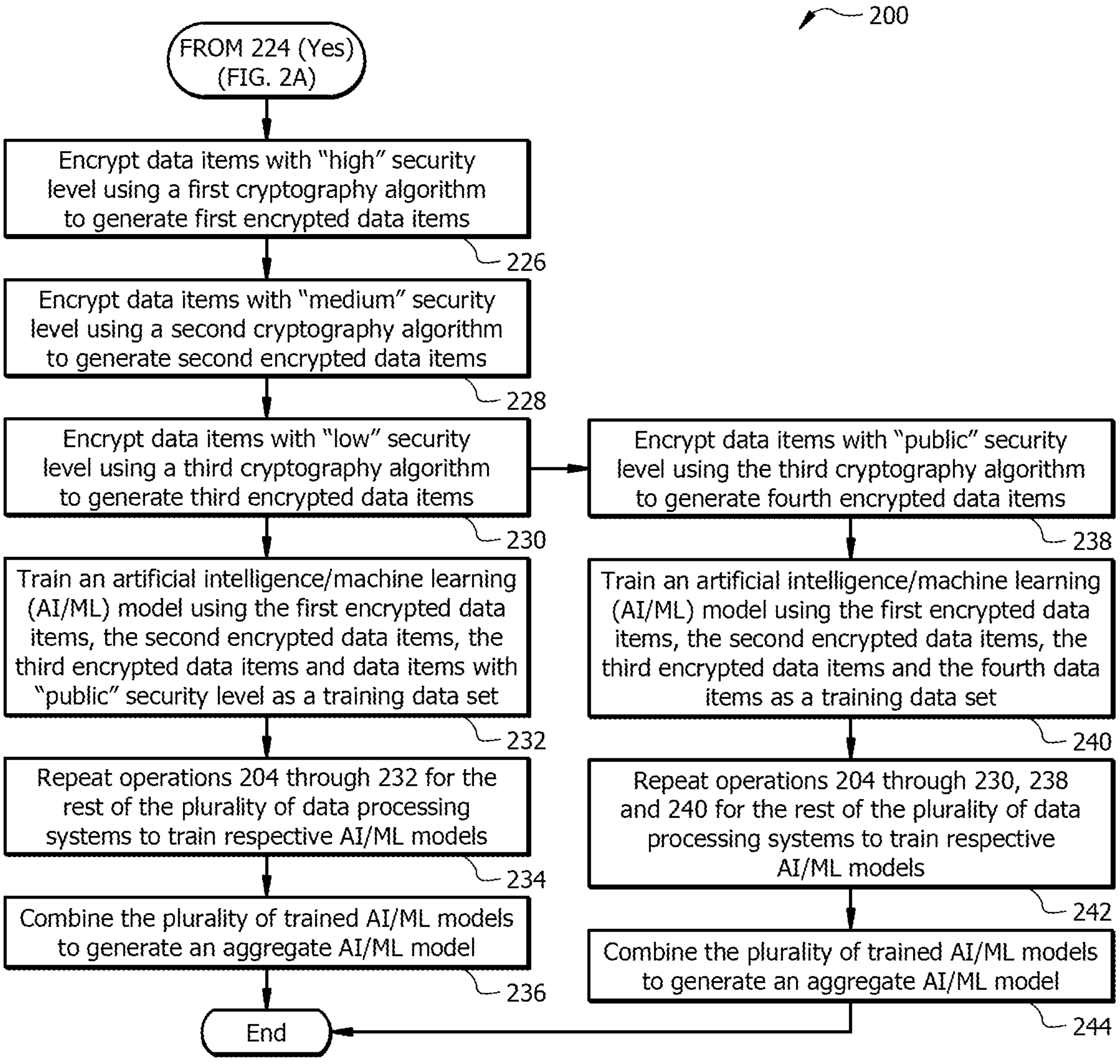

As described above, previous technologies fail to provide efficient and secure solutions for computer learning. Embodiments of the present disclosure and its advantages may be understood by referring to FIGS. 1, 2A, and 2B. FIGS. 1, 2A, and 2B are used to describe a system and method for distributed learning using dynamically encrypted data items.

System Overview

FIG. 1 illustrates an embodiment of a system 100 that is generally configured for distributed learning using dynamically encrypted data items. In certain embodiments, the system 100 comprises a plurality of data processing systems 104-1 through 104-*m* operably coupled to a central data processing system 160 via network 120. Network 102 enables the communication between the components of the system 100. The plurality of data processing systems 104-1 through 104-*m* may be also referred to as regional data processing systems. In other embodiments, system 100 may not have all the components listed and/or may have other elements instead of, or in addition to, those listed above.

In general, the data processing systems 104-1 through 104-*m* receive pluralities of data items 140-1 through 140-*m* and use the data items 140-1 through 140-*m* to train artificial intelligence/machine learning (AI/ML) models 114-1 through 114-*m*, respectively. In certain embodiments, the pluralities of data items 140-1 through 140-*m* may comprise payment data items of a plurality users. Payment data items of a user may comprise a legal name, a residential address, a bank account number, a credit card number, a debit card number, and/or payment history.

The data processing system 104-1 uses the data items 140-1 to train the AI/ML model 114-1. The data processing system 104-1 analyzes the plurality of data items 140-1 to generate weights 142-1 of the plurality of data items 140-1. The data processing system 104-1 classifies the plurality of data items 140-1 according to the data security levels 126 through 132 based on the weights 142-1 of the plurality of data items 140-1. The data processing system 104-1 compares a weight (e.g., respective one of weights 142-1) of a data item (e.g., respective one of data items 140-1) to weight ranges 118-1, 120-1, 122-1 and 124-1 according to a data security policy 116-1. The data processing system 104-1 determines if the weight (e.g., respective one of weights 142-1) is within a first weight range 118-1.

In response to determining that the weight (e.g., respective one of weights 142-1) is within the first weight range 118-1, the data processing system 104-1 determines a data security level 126 for the data item (e.g., respective one of data items 140-1) as "high." In response to determining that the weight (e.g., respective one of weights 142-1) is not within the first weight range 118-1, the data processing system 104-1 determines if the weight (e.g., respective one of weights 142-1) is within a second weight range 120-1.

In response to determining that the weight (e.g., respective one of weights 142-1) is within the second weight range 120-1, the data processing system 104-1 determines a data security level 128 for the data item (e.g., respective one of data items 140-1) as "medium." In response to determining that the weight (e.g., respective one of weights 142-1) is not within the second weight range 120-1, the data processing system 104-1 determines if the weight (e.g., respective one of weights 142-1) is within a third weight range 122-1.

In response to determining that the weight (e.g., respective one of weights 142-1) is within the third weight range 122-1, the data processing system 104-1 determines a data security level 130 for the data item (e.g., respective one of data items 140-1 of FIG. 1) as "low." In response to determining that the weight (e.g., respective one of weights 142-1) is not within the third weight range 122-1, the data processing system 104-1 determines if the weight (e.g., respective one of weights 142-1) is within a fourth weight range 124-1. In response to determining that the weight (e.g., respective one of weights 142-1) is within the fourth weight range 124-1, the data processing system 104-1 determines a data security level 132 for the data item (e.g., respective one of data items 140-1 of FIG. 1) as "public."

The data processing system 104-1 determines if all weights 142-1 of the data items 140-1 are compared to the weight ranges 118-1, 120-1, 122-1 and 124-1. In response to determining that not all weights 142-1 of the data items 140-1 are compared to the weight ranges 118-1, 120-1, 122-1 and 124-1, the process is repeated until all weights 142-1 of the data items 140-1 are compared to the weight ranges 118-1, 120-1, 122-1 and 124-1.

After classifying the plurality of data items 140-1 according to the data security levels 126 through 132 based on the weights 142-1, the data processing system 104-1 encrypts data items 144-1 with "high" security level using a first cryptography algorithm 134 to generate first encrypted data items 152-1. The data items 144-1 are a subset of the data items 140-1 that have "high" security level. The data processing system 104-1 encrypts data items 146-1 with "medium" security level using a second cryptography algorithm 136 to generate second encrypted data items 154-1. The data items 146-1 are a subset of the data items 140-1 that have "medium" security level. The data processing system 104-1 encrypts data items 148-1 with "low" security level using a third cryptography algorithm 138 to generate third encrypted data items 156-1. The data items 148-1 are a subset of the data items 140-1 that have "low" security level.

In certain embodiments, the data processing system 104-1 trains the AI/ML model 114-1 using the first encrypted data items 152-1, the second encrypted data items 154-1, the third encrypted data items 156-1 and data items 150-1 with "public" security level as a training data set. The data items 150-1 are a subset of the data items 140-1 that have "public" security level.

In other embodiments, the data processing system 104-1 encrypts data items 150-1 with "public" security level using the third cryptography algorithm 138 to generate fourth encrypted data items 158-1. In such embodiments, the data processing system 104-1 trains an artificial intelligence/machine learning (AI/ML) model 114-1 using the first encrypted data items 152-1, the second encrypted data items 154-1, the third encrypted data items 156-1 and the fourth encrypted data items 158-1 as a training data set.

The rest of the data processing systems 104-1 through 104-*m* train the rest of the AI/ML models 114-1 through 114-*m* in an analogous manner as the data processing system 104-1. The central data processing system 160 receives the trained AI/ML models 114-1 through 114-*m* from the plurality of data processing systems 104-1 through 104-*m* and combines the trained AI/ML models 114-1 through 114-*m* to generate an aggregate AI/ML model 170.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

Data Processing Systems

Each of the data processing systems 104-1 through 104-*m* is generally any device that is configured to process data and communicate with other components of the system 100 via the network 102. Each of the data processing systems 104-1 through 104-*m* comprises a respective one of processors 106-1 through 106-*m* in signal communication with a respective one of memories 110-1 through 110-*m* and a respective one of network interfaces 108-1 through 108-*m*.

Each of the processors 106-1 through 106-*m* may comprise one or more processors operably coupled to a respective one of the memories 110-1 through 110-*m*. Each of the processors 106-1 through 106-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 106-1 through 106-*m* may be a programmable logic device, a microcontroller, a microprocessor, or any suitable combination of the preceding. The one or more processors are configured to process data and may be implemented in hardware or software. For example, each of the processors 106-1 through 106-*m* may be 8-bit, 16-bit, 32-bit, 64-bit, or of any other suitable architecture. Each of the processors 106-1 through 106-*m* is configured to implement various software instructions. For example, each of the processors 106-1 through 106-*m* is configured to execute respective ones of software instructions 112-1 through 112-*m* that are stored in a respective one of the memories 110-1 through 110-*m* in order to perform the operations described herein.

Each of the network interfaces 108-1 through 108-*m* is configured to enable wired and/or wireless communications (e.g., via network 102). Each of the network interfaces 108-1 through 108-*m* is configured to communicate data between a respective one of the data processing systems 104-1 through 104-*m* and other components of the system 100. For example, each of the network interfaces 108-1 through 108-*m* may comprise a WIFI interface, a local area network (LAN) interface, a wide area network (WAN) interface, a modem, a switch, or a router. Each of the network interfaces 108-1 through 108-*m* may be configured to use any suitable type of communication protocol as would be appreciated by one of ordinary skill in the art.

Each of the memories 110-1 through 110-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 110-1 through 110-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 110-1 through 110-*m* may be implemented using one or more disks, tape drives, solid-state drives, and/or the like. Each of the memories may store any of the information described in FIGS. 1, 2A, and 2B along with any other data, instructions, logic, rules, or code operable to implement the function(s) described herein. Each of the memories 110-1 through 110-*m* is operable to store respective ones of software instructions 112-1 through 112-*m*, and/or any other data and instructions. Each of the software instructions 112-1 through 112-*m* may comprise any suitable set of software instructions, logic, rules, or code operable to be executed by respective one of the processors 106-1 through 106-*m*.

Each of the memories 110-1 through 110-*m* is further configured to store a respective one of data security policies 116-1 through 116-*m*. Each of the data security policies 116-1 through 116-*m* comprise data security levels 126, 128, 130 and 132 and associated cryptography algorithms 134, 136 and 138. The data security level 126 is a "high" security level and is associated with the cryptography algorithm 134. The data security level 128 is a "medium" security level and is associated with the cryptography algorithm 136. The data security level 130 is a "low" security level and is associated with the cryptography algorithm 138. In certain embodiments, the data security level 132 is a "public" security level and is not associated with any cryptography algorithms. In other embodiments, the data security level 132 is a "public" security level and is associated with the cryptography algorithm 138. The cryptography algorithm 134 is stronger cryptography algorithm than the cryptography algorithm 136. The cryptography algorithm 136 is stronger cryptography algorithm than the cryptography algorithm 138.

Each of the data security levels 126, 128, 130 and 132 is associated with a respective weight range. For example, each of the data security policies 116-1 through 116-*m* comprises a respective one of weight ranges 118-1 through 118-*m* that is associated with the data security level 126, a respective one of weight ranges 120-1 through **120-*m* that is associated with the data security level 128, a respective one of weight ranges 122-1 through 122-*m* that is associated with the data security level 130, and a respective one of weight ranges 124-1 through 124-*m* that is associated with the data security level 132. In certain embodiments, the weight range 118-1 is different from the weight range 118-*m*, the weight range 120-1 is different from the weight range 120-*m*, the weight range 122-1 is different from the weight range 122-*m*, and the weight range 124-1 is different from the weight range 124-*m***.

Each of the memories 110-1 through **110-*m* is operable to further store a respective one of AI/ML models 114-1 through 114-*m*. Each of the AI/ML models 114-1 through 114-*m* may comprise a neural network model or a natural language processing (NLP) model that is operable to be executed by a respective one of the processors 106-1 through 106-*m***.

In operation, the processors 106-1 through **106-*m* of the data processing systems 104-1 through 104-*m* receive pluralities of data items 140-1 through 140-*m* and use the data items 140-1 through 140-*m* to train the AI/ML models 114-1 through 114-*m*, respectively. In certain embodiments, the pluralities of data items 140-1 through 140-*m*** may comprise payment data items of a plurality users. Payment data items of a user may comprise a legal name, a residential address, a bank account number, a credit card number, a debit card number, and/or payment history.

The processor 106-1 of the data processing system 104-1 uses the data items 140-1 to train the AI/ML model 114-1. The processor 106-1 of the data processing system 104-1 analyzes the plurality of data items 140-1 to generate weights 142-1 of the plurality of data items 140-1. The processor 106-1 of the data processing system 104-1 classifies the plurality of data items 140-1 according to the data security levels 126 through 132 based on the weights 142-1 of the plurality of data items 140-1. The processor 106-1 of the data processing system 104-1 compares a weight (e.g., respective one of weights 142-1) of a data item (e.g., respective one of data items 140-1) to weight ranges 118-1, 120-1, 122-1 and 124-1 according to a data security policy 116-1. The processor 106-1 of the data processing system 104-1 determines if the weight (e.g., respective one of weights 142-1) is within a first weight range 118-1.

In response to determining that the weight (e.g., respective one of weights 142-1) is within the first weight range 118-1, the processor 106-1 of the data processing system 104-1 determines a data security level 126 for the data item (e.g., respective one of data items 140-1) as "high." In embodiment when the data items 140-1 comprise payment data items of a user, the data item with "high" security level may include a bank account number, a credit card number, or a debit card number of the user. In response to determining that the weight (e.g., respective one of weights 142-1) is not within the first weight range 118-1, the processor 106-1 of the data processing system 104-1 determines if the weight (e.g., respective one of weights 142-1) is within a second weight range 120-1.

In response to determining that the weight (e.g., respective one of weights 142-1) is within the second weight range 120-1, the processor 106-1 of the data processing system 104-1 determines a data security level 128 for the data item (e.g., respective one of data items 140-1) as "medium." In embodiment when the data items 140-1 comprise payment data items of a user, the data item with "medium" security level may include payment history of the user. In response to determining that the weight (e.g., respective one of weights 142-1) is not within the second weight range 120-1, the processor 106-1 of the data processing system 104-1 determines if the weight (e.g., respective one of weights 142-1) is within a third weight range 122-1.

In response to determining that the weight (e.g., respective one of weights 142-1) is within the third weight range 122-1, the processor 106-1 of the data processing system 104-1 determines a data security level 130 for the data item (e.g., respective one of data items 140-1) as "low." In embodiment when the data items 140-1 comprise payment data items of a user, the data item with "low" security level may include a residential address of the user. In response to determining that the weight (e.g., respective one of weights 142-1) is not within the third weight range 122-1, the processor 106-1 of the data processing system 104-1 determines if the weight (e.g., respective one of weights 142-1) is within a fourth weight range 124-1. In response to determining that the weight (e.g., respective one of weights 142-1) is within the fourth weight range 124-1, the processor 106-1 of the data processing system 104-1 determines a data security level 132 for the data item (e.g., respective one of data items 140-1) as "public." In embodiment when the data items 140-1 comprise payment data items of a user, the data item with "public" security level may include a legal name of the user.

The processor 106-1 of the data processing system 104-1 determines if all weights 142-1 of the data items 140-1 are compared to the weight ranges 118-1, 120-1, 122-1 and 124-1. In response to determining that not all weights 142-1 of the data items 140-1 are compared to the weight ranges 118-1, 120-1, 122-1 and 124-1, the process is repeated until all weights 142-1 of the data items 140-1 are compared to the weight ranges 118-1, 120-1, 122-1 and 124-1.

After classifying the plurality of data items 140-1 according to the data security levels 126 through 132 based on the weights 142-1, the processor 106-1 of the data processing system 104-1 encrypts data items 144-1 with "high" security level using a first cryptography algorithm 134 to generate first encrypted data items 152-1. The data items 144-1 are a subset of the data items 140-1 that have "high" security level. The processor 106-1 of the data processing system 104-1 encrypts data items 146-1 with "medium" security level using a second cryptography algorithm 136 to generate second encrypted data items 154-1. The data items 146-1 are a subset of the data items 140-1 that have "medium" security level. The processor 106-1 of the data processing system 104-1 encrypts data items 148-1 with "low" security level using a third cryptography algorithm 138 to generate third encrypted data items 156-1. The data items 148-1 are a subset of the data items 140-1 that have "low" security level.

In certain embodiments, the processor 106-1 of the data processing system 104-1 trains the AI/ML model 114-1 using the first encrypted data items 152-1, the second encrypted data items 154-1, the third encrypted data items 156-1 and data items 150-1 with "public" security level as a training data set. The data items 150-1 are a subset of the data items 140-1 that have "public" security level.

In other embodiments, the processor 106-1 of the data processing system 104-1 encrypts data items 150-1 with "public" security level using the third cryptography algorithm 138 to generate fourth encrypted data items 158-1. In such embodiments, the processor 106-1 of the data processing system 104-1 trains the AI/ML model 114-1 using the first encrypted data items 152-1, the second encrypted data items 154-1, the third encrypted data items 156-1 and the fourth encrypted data items 158-1 as a training data set.

The rest of the data processing systems 104-1 through 104-*m* train the rest of the AI/ML models 114-1 through 114-*m* in an analogous manner as the data processing system 104-1. For example, the processor 106-*m* of the data processing system 104-*m* uses the data items 140-*m* to train the AI/ML model 114-*m*. The processor 106-*m* of the data processing system 104-*m* analyzes the plurality of data items 140-*m* to generate weights 142-*m* of the plurality of data items 140-*m*. The processor 106-*m* of the data processing system 104-*m* classifies the plurality of data items 140-*m* according to the data security levels 126 through 132 based on the weights 142-*m* of the plurality of data items 140-*m*. The processor 106-*m* of the data processing system 104-*m* compares a weight (e.g., respective one of weights 142-*m*) of a data item (e.g., respective one of data items 140-*m*) to weight ranges 118-*m*, 120-*m*, 122-*m* and 124-*m* according to the data security policy 116-*m*. The processor 106-*m* of the data processing system 104-*m* determines if the weight (e.g., respective one of weights 142-*m*) is within a first weight range 118-*m*.

In response to determining that the weight (e.g., respective one of weights 142-*m*) is within the first weight range 118-*m*, the processor 106-*m* of the data processing system 104-*m* determines a data security level 126 for the data item (e.g., respective one of data items 140-1) as "high." In response to determining that the weight (e.g., respective one of weights 142-1) is not within the first weight range 118-*m*, the processor 106-*m* of the data processing system 104-*m* determines if the weight (e.g., respective one of weights 142-1) is within a second weight range 120-*m*.

In response to determining that the weight (e.g., respective one of weights 142-*m*) is within the second weight range 120-*m*, the processor 106-*m* of the data processing system 104-*m* determines a data security level 128 for the data item (e.g., respective one of data items 140-*m*) as "medium." In response to determining that the weight (e.g., respective one of weights 142-*m*) is not within the second weight range 120-*m*, the processor 106-*m* of the data processing system 104-*m* determines if the weight (e.g., respective one of weights 142-*m*) is within a third weight range 122-*m*.

In response to determining that the weight (e.g., respective one of weights 142-*m*) is within the third weight range 122-*m*, the processor 106-*m* of the data processing system 104-*m* determines a data security level 130 for the data item (e.g., respective one of data items 140-*m*) as "low." In response to determining that the weight (e.g., respective one of weights 142-*m*) is not within the third weight range 122-*m*, the processor 106-*m* of the data processing system 104-*m* determines if the weight (e.g., respective one of weights 142-*m*) is within a fourth weight range 124-*m*. In response to determining that the weight (e.g., respective one of weights 142-*m*) is within the fourth weight range 124-*m*, the processor 106-*m* of the data processing system 104-*m* determines a data security level 132 for the data item (e.g., respective one of data items 140-*m*) as "public."

The processor 106-*m* of the data processing system 104-1 determines if all weights 142-*m* of the data items 140-*m* are compared to the weight ranges 118-*m*, 120-*m*, 122-*m* and 124-*m*. In response to determining that not all weights 142-*m* of the data items 140-*m* are compared to the weight ranges 118-*m*, 120-*m*, 122-*m* and 124-*m*, the process is repeated until all weights 142-*m* of the data items 140-*m* are compared to the weight ranges 118-*m*, 120-*m*, 122-*m* and 124-*m*.

After classifying the plurality of data items 140-*m* according to the data security levels 126 through 132 based on the weights 142-*m*, the processor 106-*m* of the data processing system 104-*m* encrypts data items 144-*m* with "high" security level using a first cryptography algorithm 134 to generate first encrypted data items 152-*m*. The data items 144-*m* are a subset of the data items 140-*m* that have "high" security level. The processor 106-*m* of the data processing system 104-*m* encrypts data items 146-*m* with "medium" security level using a second cryptography algorithm 136 to generate second encrypted data items 154-*m*. The data items 146-*m* are a subset of the data items 140-*m* that have "medium" security level. The processor 106-*m* of the data processing system 104-*m* encrypts data items 148-*m* with "low" security level using a third cryptography algorithm 138 to generate third encrypted data items 156-*m*. The data items 148-*m* are a subset of the data items 140-*m* that have "low" security level.

In certain embodiments, the processor 106-*m* of the data processing system 104-*m* trains the AI/ML model 114-*m* using the first encrypted data items 152-*m*, the second encrypted data items 154-*m*, the third encrypted data items 156-*m* and data items 150-*m* with "public" security level as a training data set. The data items 150-*m* are a subset of the data items 140-*m* that have "public" security level.

In other embodiments, the processor 106-*m* of the data processing system 104-*m* encrypts data items 150-*m* with "public" security level using the third cryptography algorithm 138 to generate fourth encrypted data items 158-*m*. In such embodiments, the processor 106-*m* of the data processing system 104-*m* trains the AI/ML model 114-*m* using the first encrypted data items 152-*m*, the second encrypted data items 154-*m*, the third encrypted data items 156-*m* and the fourth encrypted data items 158-*m* as a training data set.

After training the AI/ML models 114-1 through 114-*m*, the processors 106-1 through 106-*m* of the data processing system 104-1 through 104-*m* send the trained AI/ML models 114-1 through 114-*m* to the central data processing system 160.

Central Data Processing System

The central data processing system 160 is generally any device that is configured to process data and communicate with other components of the system 100 via the network 102. The central data processing system 160 may comprise a processor 162 in signal communication with a memory 166 and a network interface 164.

Processor 162 comprises one or more processors operably coupled to the memory 166. Processor 162 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 162 may be a programmable logic device, a microcontroller, a microprocessor, or any suitable combination of the preceding. The one or more processors are configured to process data and may be implemented in hardware or software. Processor 162 may be 8-bit, 16-bit, 32-bit, 64-bit, or of any other suitable architecture. The one or more processors are configured to implement various software instructions to perform the operations described herein. For example, the one or more processors are configured to execute software instructions 168 to perform one or more functions of the central data processing system 160 described herein.

Network interface 164 is configured to enable wired and/or wireless communications (e.g., via network 102). Network interface 164 is configured to communicate data between the central data processing system 160 and other components of the system 100. For example, network interface 164 may comprise a WIFI interface, a local area network (LAN) interface, a wide area network (WAN)

interface, a modem, a switch, or a router. Processor 162 is configured to send and receive data using the network interface 164. Network interface 164 may be configured to use any suitable type of communication protocol as would be appreciated by one of ordinary skill in the art.

The memory 166 comprises a non-transitory computer-readable medium such as one or more disks, tape drives, or solid-state drives, and may be used as an over-flow data storage device, to store programs when such programs are selected for execution, and to store instructions and data that are read during program execution. Memory 166 may be volatile or non-volatile and may comprise a read-only memory (ROM), random-access memory (RAM), ternary content-addressable memory (TCAM), dynamic random-access memory (DRAM), and static random-access memory (SRAM). Memory 166 may be implemented using one or more disks, tape drives, solid-state drives, and/or the like. Memory 166 may store any of the information described in FIGS. 1, 2A, and 2B along with any other data, instructions, logic, rules, or code operable to implement the function(s) described herein. Memory 166 is operable to store software instructions 168 and/or any other data and instructions. The software instructions 168 may comprise any suitable set of software instructions, logic, rules, or code operable to be executed by processor 162.

In operation, the processor 162 of the central data processing system 160 receives the trained AI/ML models 114-1 through **114-*m* from the plurality of data processing systems 104-1 through 104-*m* and combines the trained AI/ML models 114-1 through 114-*m* to generate an aggregate AI/ML model 170. In certain embodiments, the aggregate AI/ML model 170 may be executed by the processor 162 of the central data processing system 160**.

Example Method for Distributed Learning Using Dynamically Encrypted Data Items FIGS. 2A and 2B illustrate an example flowchart of a method 200 for distributed learning using dynamically encrypted data items. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 112-1 through **112-*m* and/or 168 of FIG. 1), stored on non-transitory, tangible, machine-readable medium (e.g., memories 110-1 through 110-*m* and/or 166 of FIG. 1) that when executed by one or more processors (e.g., processors 106-1 through 106-*m* and/or 162 of FIG. 1) may cause the one or more processors to perform operations 202-244**.

Method 200 starts with operation 202, where processors 106-1 through **106-*m* of data processing systems 104-1 through 104-*m* receive pluralities of data items 140-1 through 140-*m*, respectively. At operation 204, the processor 106-1 of the data processing system 104-1 analyzes the plurality of data items 140-1 to generate weights 142-1 of the plurality of data items 140-1**.

After performing operation 204, method 200 performs operations 206 through 224 to classify the plurality of data items 140-1 according to the data security levels 126 through 132 based on the weights 142-1 of the plurality of data items 140-1. At operation 206, the processor 106-1 of the data processing system 104-1 compares a weight (e.g., respective one of weights 142-1 of FIG. 1) of a data item (e.g., respective one of data items 140-1 of FIG. 1) to weight ranges 118-1, 120-1, 122-1 and 124-1 according to a data security policy 116-1.

At operation 208, the processor 106-1 of the data processing system 104-1 determines if the weight (e.g., respective one of weights 142-1 of FIG. 1) is within a first weight range 118-1. In response to determining at operation 208 that the weight (e.g., respective one of weights 142-1 of FIG. 1) is within the first weight range 118-1, method 200 continues to operation 210. At operation 210, the processor 106-1 of the data processing system 104-1 determines a security level 126 for the data item (e.g., respective one of data items 140-1 of FIG. 1) as "high."

In response to determining at operation 208 that the weight (e.g., respective one of weights 142-1 of FIG. 1) is not within the first weight range 118-1, method 200 continues to operation 212. At operation 212, the processor 106-1 of the data processing system 104-1 determines if the weight (e.g., respective one of weights 142-1 of FIG. 1) is within a second weight range 120-1. In response to determining at operation 212 that the weight (e.g., respective one of weights 142-1 of FIG. 1) is within the second weight range 120-1, method 200 continues to operation 214. At operation 214, the processor 106-1 of the data processing system 104-1 determines a security level 128 for the data item (e.g., respective one of data items 140-1 of FIG. 1) as "medium."

In response to determining at operation 212 that the weight (e.g., respective one of weights 142-1 of FIG. 1) is not within the second weight range 120-1, method 200 continues to operation 216. At operation 216, the processor 106-1 of the data processing system 104-1 determines if the weight (e.g., respective one of weights 142-1 of FIG. 1) is within a third weight range 122-1. In response to determining at operation 216 that the weight (e.g., respective one of weights 142-1 of FIG. 1) is within the third weight range 122-1, method 200 continues to operation 218. At operation 218, the processor 106-1 of the data processing system 104-1 determines a security level 130 for the data item (e.g., respective one of data items 140-1 of FIG. 1) as "low."

In response to determining at operation 216 that the weight (e.g., respective one of weights 142-1 of FIG. 1) is not within the third weight range 122-1, method 200 continues to operation 220. At operation 220, the processor 106-1 of the data processing system 104-1 determines if the weight (e.g., respective one of weights 142-1 of FIG. 1) is within a fourth weight range 124-1. In response to determining at operation 220 that the weight (e.g., respective one of weights 142-1 of FIG. 1) is within the fourth weight range 124-1, method 200 continues to operation 222. At operation 222, the processor 106-1 of the data processing system 104-1 determines a security level 132 for the data item (e.g., respective one of data items 140-1 of FIG. 1) as "public."

At operation 224, the processor 106-1 of the data processing system 104-1 determines if all weights 142-1 of the data items 140-1 are compared to the weight ranges 118-1, 120-1, 122-1 and 124-1. In response to determining at operation 224 that not all weights 142-1 of the data items 140-1 are compared to the weight ranges 118-1, 120-1, 122-1 and 124-1, method 200 goes back to operation 206. In certain embodiments, operations 206 through 224 are repeated one or more times until all weights 142-1 of the data items 140-1 are compared to the weight ranges 118-1, 120-1, 122-1 and 124-1.

In response to determining at operation 224 that all weights 142-1 of the data items 140-1 are compared to the weight ranges 118-1, 120-1, 122-1 and 124-1, method 200 continues to operation 226. At operation 226, the processor

106-1 of the data processing system 104-1 encrypts data items 144-1 with "high" security level using a first cryptography algorithm 134 to generate first encrypted data items 152-1.

At operation 228, the processor 106-1 of the data processing system 104-1 encrypts data items 146-1 with "medium" security level using a second cryptography algorithm 136 to generate second encrypted data items 154-1.

At operation 230, the processor 106-1 of the data processing system 104-1 encrypts data items 148-1 with "low" security level using a third cryptography algorithm 138 to generate third encrypted data items 156-1.

In certain embodiments, after performing operation 230, method 200 continues to operations 232, 234 and 236. At operation 232, the processor 106-1 of the data processing system 104-1 trains an artificial intelligence/machine learning (AI/ML) model 114-1 using the first encrypted data items 152-1, the second encrypted data items 154-1, the third encrypted data items 156-1 and data items 150-1 with "public" security level as a training data set.

At operation 234, operations 204 through 232 are repeated for the rest of the plurality of data processing systems 104-1 through **104-*m* to train the rest of the AI/ML models 114-1 through 114-*m*. At operation 236, the processor 162 of the central data processing system 160 receives the trained AI/ML models 114-1 through 114-*m* from the plurality of data processing systems 104-1 through 104-*m* and combines the trained AI/ML models 114-1 through 114-*m* to generate an aggregate AI/ML model 170. After performing operation 236, method 200** ends.

In other embodiments, after performing operation 230, method 200 continues to operations 238, 240, 242 and 244. At operation 238, the processor 106-1 of the data processing system 104-1 encrypts data items 150-1 with "public" security level using the third cryptography algorithm 138 to generate fourth encrypted data items 158-1.

At operation 240, the processor 106-1 of the data processing system 104-1 trains an artificial intelligence/machine learning (AI/ML) model 114-1 using the first encrypted data items 152-1, the second encrypted data items 154-1, the third encrypted data items 156-1 and the fourth encrypted data items 158-1 as a training data set.

At operation 242, operations 204 through 230, 238 and 240 are repeated for the rest of the plurality of data processing systems 104-1 through **104-*m* to train the rest of the AI/ML models 114-1 through 114-*m*. At operation 244, the processor 162 of the central data processing system 160 receives the trained AI/ML models 114-1 through 114-*m* from the plurality of data processing systems 104-1 through 104-*m* and combines the trained AI/ML models 114-1 through 114-*m* to generate an aggregate AI/ML model 170. After performing operation 244, method 200** ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:

a central data processing system; and a plurality of data processing systems operably coupled to the central data processing system, wherein a first data processing system comprises:

a first memory configured to store:

a first data security policy, wherein the first data security policy comprises:

a first plurality of security levels, wherein the first plurality of security levels comprise a high security level, a medium security level, a low security level, and a public security level;

a first plurality of weight ranges associated with the first plurality of security levels; and a first plurality of cryptography algorithms associated with the first plurality of security levels; and a first artificial intelligence/machine learning (AI/ML) model; and a first processor operably coupled to the first memory and configured to:

receive a first plurality of data items;

analyze the first plurality of data items to generate a weight for each of the first plurality of data items;

classify the first plurality of data items according to the first plurality of security levels based on the weights of the first plurality of data items, wherein classifying the first plurality of data items comprises:

comparing a first weight of a first data item of the first plurality of data items to the first plurality of weight ranges;

in response to determining that the first weight of the first data item of the first plurality of data items is within a first weight range of the first plurality of weight ranges, determining that the first data item of the first plurality of data items has the high security level;

comparing a second weight of a second data item of the first plurality of data items to the first plurality of weight ranges; and in response to determining that the second weight of the second data item of the first plurality of data items is within a second weight range of the first plurality of weight ranges, determining that the second data item of the first plurality of data items has the medium security level;

encrypt a first subset of the first plurality of data items having the high security level with a first cryptography algorithm to generate first encrypted data items;

encrypt a second subset of the first plurality of data items having the medium security level with a second cryptography algorithm to generate second encrypted data items, wherein the second cryptography algorithm is different from the first cryptography algorithm; and train the first AI/ML model using a first training data set, wherein the first training data set comprises the first encrypted data items and the second encrypted data items.

2. The system of claim 1, wherein classifying the first plurality of data items further comprises:

comparing a third weight of a third data item of the first plurality of data items to the first plurality of weight ranges;

in response to determining that the third weight of the third data item of the first plurality of data items is within a third weight range of the first plurality of weight ranges, determining that the third data item of the first plurality of data items has the low security level;

comparing a fourth weight of a fourth data item of the first plurality of data items to the first plurality of weight ranges; and in response to determining that the fourth weight of the fourth data item of the first plurality of data items is within a fourth weight range of the first plurality of weight ranges, determining that the fourth data item of the first plurality of data items has the public security level.

3. The system of claim 2, wherein the first processor is further configured to encrypt a third subset of the first plurality of data items having the low security level with a third cryptography algorithm to generate third encrypted data items, wherein:

the third cryptography algorithm is different from the first cryptography algorithm and the second cryptography algorithm; and the first training data set further comprises the third encrypted data items and a fourth subset of the first plurality of data items having the public security level.

4. The system of claim 2, wherein the first processor is further configured to:

encrypt a third subset of the first plurality of data items having the low security level with a third cryptography algorithm to generate third encrypted data items; and encrypt a fourth subset of the first plurality of data items having the public security level with the third cryptography algorithm to generate fourth encrypted data items, wherein:

the third cryptography algorithm is different from the first cryptography algorithm and the second cryptography algorithm; and the first training data set further comprises the third encrypted data items and the fourth encrypted data items.

5. The system of claim 4, wherein a second data processing system comprises:

a second memory configured to store:

a second data security policy, wherein the second data security policy comprises:

a second plurality of security levels, wherein the second plurality of security levels comprise the high security level, the medium security level, the low security level, and the public security level;

a second plurality of weight ranges associated with the second plurality of security levels; and a second plurality of cryptography algorithms associated with the second plurality of security levels; and a second AI/ML model; and a second processor operably coupled to the second memory and configured to:

receive a second plurality of data items;

analyze the second plurality of data items to generate a weight for each of the second plurality of data items;

classify the second plurality of data items according to the second plurality of security levels based on the weights of the second plurality of data items, wherein classifying the second plurality of data items comprises:

comparing a first weight of a first data item of the second plurality of data items to the second plurality of weight ranges;

in response to determining that the second weight of the first data item of the second plurality of data items is within a first weight range of the second plurality of weight ranges, determining that the first data item of the second plurality of data items has the high security level;

comparing a second weight of a second data item of the second plurality of data items to the second plurality of weight ranges; and in response to determining that the second weight of the second plurality of data items is within a second weight range of the second plurality of weight ranges, determining that the second data item of the second plurality of data items has the medium security level;

encrypt a subset of the second plurality of data items having the high security level with the first cryptography algorithm to generate fifth encrypted data items;

encrypt a subset of the second plurality of data items having the medium security level with the second cryptography algorithm to generate sixth encrypted data items; and train the second AI/ML model using a second training data set, wherein the second training data set comprises the fifth encrypted data items and the sixth encrypted data items.

6. The system of claim 5, wherein:

classifying the second plurality of data items further comprises:

comparing a third weight of a third data item of the second plurality of data items to the second plurality of weight ranges;

in response to determining that the third weight of the third data item of the second plurality of data items is within a third weight range of the second plurality of weight ranges, determining that the third data item of the second plurality of data items has the low security level;

comparing a fourth weight of a fourth data item of the second plurality of data items to the second plurality of weight ranges; and in response to determining that the fourth weight of the fourth data item of the second plurality of data items is within a fourth weight range, determining that the fourth data item of the second plurality of data items has the public security level; and the second processor is further configured to encrypt a third subset of the second plurality of data items having the low security level with the third cryptography algorithm to generate seventh encrypted data items, wherein the second training data set further comprises the seventh 20 encrypted data items and a fourth subset of the second plurality of data items having the public security level.

7. The system of claim 5, wherein the central data processing system comprises a third processor configured to:

receive the first AI/ML model and the second AI/ML model; and generate an aggregate AI/ML model based on the first AI/ML model and the second AI/ML model.

8. A method comprising:

receiving a first plurality of data items;

analyzing the first plurality of data items to generate a weight for each of the first plurality of data items;

classifying the first plurality of data items according to a first plurality of security levels based on the weights of the first plurality of data items, wherein the first plurality of security levels comprise a high security level, a medium security level, a low security level, and a public security level, and wherein classifying the first plurality of data items comprises:

comparing a first weight of a first data item of the first plurality of data items to a first plurality of weight ranges associated with the first plurality of security levels;

in response to determining that the first weight of the first data item of the first plurality of data items is within a first weight range of the first plurality of weight ranges, determining that the first data item of the first plurality of data items has the high security level;

comparing a second weight of a second data item of the first plurality of data items to the first plurality of weight ranges; and in response to determining that the second weight of the second data item of the first plurality of data items is within a second weight range of the first plurality of weight ranges, determining that the second data item of the first plurality of data items has the medium security level;

encrypting a first subset of the first plurality of data items having the high security level with a first cryptography algorithm to generate first encrypted data items;

encrypting a second subset of the first plurality of data items having the medium security level with a second cryptography algorithm to generate second encrypted data items, wherein the second cryptography algorithm is different from the first cryptography algorithm; and training a first AI/ML model using a first training data set, wherein the first training data set comprises the first encrypted data items and the second encrypted data items.

9. The method of claim 8, wherein classifying the first plurality of data items further comprises:

comparing a third weight of a third data item of the first plurality of data items to the first plurality of weight ranges;

in response to determining that the third weight of the third data item of the first plurality of data items is within a third weight range of the first plurality of weight ranges, determining that the third data item of the first plurality of data items has the low security level;

comparing a fourth weight of a fourth data item of the first plurality of data items to the first plurality of weight ranges; and in response to determining that the fourth weight of the fourth data item of the first plurality of data items is within a fourth weight range of the first plurality of weight ranges, determining that the fourth data item of the first plurality of data items has the public security level.

10. The method of claim 9, further comprising encrypting a third subset of the first plurality of data items having the low security level with a third cryptography algorithm to generate third encrypted data items, wherein:

the third cryptography algorithm is different from the first cryptography algorithm and the second cryptography algorithm; and the first training data set further comprises the third encrypted data items and a fourth subset of the first plurality of data items having the public security level.

11. The method of claim 9, further comprising:

encrypting a third subset of the first plurality of data items having the low security level with a third cryptography algorithm to generate third encrypted data items; and encrypting a fourth subset of the first plurality of data items having the public security level with the third cryptography algorithm to generate fourth encrypted data items, wherein:

the third cryptography algorithm is different from the first cryptography algorithm and the second cryptography algorithm; and the first training data set further comprises the third encrypted data items and the fourth encrypted data items.

12. The method of claim 11, further comprising:

receiving a second plurality of data items;

analyzing the second plurality of data items to generate a weight for each of the second plurality of data items;

classifying the second plurality of data items according to a second plurality of security levels based on the weights of the second plurality of data items, wherein the second plurality of security levels comprise the high security level, the medium security level, the low security level, and the public security level, and wherein classifying the second plurality of data items comprises:

comparing a first weight of a first data item of the second plurality of data items to a second plurality of weight ranges associated with the second plurality of security levels;

in response to determining that the second weight of the first data item of the second plurality of data items is within a first weight range of the second plurality of weight ranges, determining that the first data item of the second plurality of data items has the high security level;

comparing a second weight of a second data item of the second plurality of data items to the second plurality of weight ranges; and in response to determining that the second weight of the second plurality of data items is within a second weight range of the second plurality of weight ranges, determining that the second data item of the second plurality of data items has the medium security level;

encrypting a subset of the second plurality of data items having the high security level with the first cryptography algorithm to generate fifth encrypted data items;

encrypting a subset of the second plurality of data items having the medium security level with the second cryptography algorithm to generate sixth encrypted data items; and training a second AI/ML model using a second training data set, wherein the second training data set comprises the fifth encrypted data items and the sixth encrypted data items.

13. The method of claim 12, wherein:

classifying the second plurality of data items further comprises:

comparing a third weight of a third data item of the second plurality of data items to the second plurality of weight ranges;

in response to determining that the third weight of the third data item of the second plurality of data items is within a third weight range of the second plurality of weight ranges, determining that the third data item of the second plurality of data items has the low security level;

comparing a fourth weight of a fourth data item of the second plurality of data items to the second plurality of weight ranges; and in response to determining that the fourth weight of the fourth data item of the second plurality of data items is within a fourth weight range, determining that the fourth data item of the second plurality of data items has the public security level; and the method further comprises encrypting a third subset of the second plurality of data items having the low security level with the third cryptography algorithm to generate seventh encrypted data items, wherein the second training data set further comprises the seventh encrypted data items and a fourth subset of the second plurality of data items having the public security level.

14. The method of claim 13, further comprising:

receiving the first AI/ML model and the second AI/ML model; and generating an aggregate AI/ML model based on the first AI/ML model and the second AI/ML model.

15. A non-transitory computer-readable medium storing instructions that, when executed by one or more processors, cause the one or more processors to:

receive a first plurality of data items;

analyze the first plurality of data items to generate a weight for each of the first plurality of data items;

classify the first plurality of data items according to a first plurality of security levels based on the weights of the first plurality of data items, wherein the first plurality of security levels comprise a high security level, a medium security level, a low security level, and a public security level, and wherein classifying the first plurality of data items comprises:

comparing a first weight of a first data item of the first plurality of data items to a first plurality of weight ranges associated with the first plurality of security levels;

in response to determining that the first weight of the first data item of the first plurality of data items is within a first weight range of the first plurality of weight ranges, determining that the first data item of the first plurality of data items has the high security level;

comparing a second weight of a second data item of the first plurality of data items to the first plurality of weight ranges; and in response to determining that the second weight of the second data item of the first plurality of data items is within a second weight range of the first plurality of weight ranges, determining that the second data item of the first plurality of data items has the medium security level;

encrypt a first subset of the first plurality of data items having the high security level with a first cryptography algorithm to generate first encrypted data items;

encrypt a second subset of the first plurality of data items having the medium security level with a second cryptography algorithm to generate second encrypted data items, wherein the second cryptography algorithm is different from the first cryptography algorithm; and train a first AI/ML model using a first training data set, wherein the first training data set comprises the first encrypted data items and the second encrypted data items.

16. The non-transitory computer-readable medium of claim 15, wherein classifying the first plurality of data items further comprises:

comparing a third weight of a third data item of the first plurality of data items to the first plurality of weight ranges;

in response to determining that the third weight of the third data item of the first plurality of data items is within a third weight range of the first plurality of weight ranges, determining that the third data item of the first plurality of data items has the low security level;

comparing a fourth weight of a fourth data item of the first plurality of data items to the first plurality of weight ranges; and in response to determining that the fourth weight of the fourth data item of the first plurality of data items is within a fourth weight range of the first plurality of weight ranges, determining that the fourth data item of the first plurality of data items has the public security level.

17. The non-transitory computer-readable medium of claim 16, wherein the instructions, when executed by the one or more processors, further cause the one or more processors to:

encrypting a third subset of the first plurality of data items having the low security level with a third cryptography algorithm to generate third encrypted data items, wherein:

the third cryptography algorithm is different from the first cryptography algorithm and the second cryptography algorithm; and the first training data set further comprises the third encrypted data items and a fourth subset of the first plurality of data items having the public security level.

18. The non-transitory computer-readable medium of claim 16, wherein the instructions, when executed by the one or more processors, further cause the one or more processors to:

encrypting a third subset of the first plurality of data items having the low security level with a third cryptography algorithm to generate third encrypted data items; and encrypting a fourth subset of the first plurality of data items having the public security level with the third cryptography algorithm to generate fourth encrypted data items, wherein:

the third cryptography algorithm is different from the first cryptography algorithm and the second cryptography algorithm; and the first training data set further comprises the third encrypted data items and the fourth encrypted data items.

19. The non-transitory computer-readable medium of claim 15, wherein the instructions, when executed by the one or more processors, further cause the one or more processors to:

receive a second plurality of data items;

analyze the second plurality of data items to generate a weight for each of the second plurality of data items;

classify the second plurality of data items according to a second plurality of security levels based on the weights of the second plurality of data items, wherein the second plurality of security levels comprise the high security level, the medium security level, the low security level, and the public security level, and wherein classifying the second plurality of data items comprises:

comparing a first weight of a first data item of the second plurality of data items to a second plurality of weight ranges associated with the second plurality of security levels;

in response to determining that the second weight of the first data item of the second plurality of data items is within a first weight range of the second plurality of weight ranges, determining that the first data item of the second plurality of data items has the high security level;

comparing a second weight of a second data item of the second plurality of data items to the second plurality of weight ranges; and in response to determining that the second weight of the second plurality of data items is within a second weight range of the second plurality of weight ranges, determining that the second data item of the second plurality of data items has the medium security level;

encrypt a subset of the second plurality of data items having the high security level with the first cryptography algorithm to generate fifth encrypted data items;

encrypt a subset of the second plurality of data items having the medium security level with the second cryptography algorithm to generate sixth encrypted data items; and train a second AI/ML model using a second training data set, wherein the second training data set comprises the fifth encrypted data items and the sixth encrypted data items.

20. The non-transitory computer-readable medium of claim 19, wherein the instructions, when executed by the one or more processors, further cause the one or more processors to:

receive the first AI/ML model and the second AI/ML model; and generate an aggregate AI/ML model based on the first AI/ML model and the second AI/ML model.

* * * * *